US012777049B2

(12) United States Patent
Gill et al.

(10) Patent No.: US 12,777,049 B2
(45) Date of Patent: Oct. 27, 2026

(54) SYSTEMS AND METHODS FOR TRAINING A MACHINE LEARNING MODEL TO CONFIRM RESULTS OF EVENT DETECTION

(71) Applicant: Capital One Services, LLC, McLean, VA (US)

(72) Inventors: Renee Gill, New York, NY (US); Joshua Edwards, Philadelphia, PA (US); Kathryn Tikoian, South Orange, NJ (US)

(73) Assignee: Capital One Services, LLC, McLean, VA (US)

( * ) Notice: Subject to any disclaimer, the term of this patent is extended or adjusted under 35 U.S.C. 154(b) by 893 days.

(21) Appl. No.: 18/145,567

(22) Filed: Dec. 22, 2022

(65) Prior Publication Data

US 2024/0214397 A1 Jun. 27, 2024

(51) Int. Cl.

| | |
|---|---|
| ***H04L 9/40*** | (2022.01) |
| ***G06N 3/045*** | (2023.01) |
| ***G06N 3/09*** | (2023.01) |
| ***H04L 41/0631*** | (2022.01) |
| ***H04L 51/02*** | (2022.01) |

(52) U.S. Cl.

CPC ......... *H04L 63/1416* (2013.01); *G06N 3/045* (2023.01); *G06N 3/09* (2023.01); *H04L 41/0631* (2013.01); *H04L 51/02* (2013.01)

(58) Field of Classification Search

CPC . H04L 63/1416; H04L 41/0631; H04L 51/02; H04L 41/16; G06N 3/045; G06N 3/09

See application file for complete search history.

(56) References Cited

U.S. PATENT DOCUMENTS

| | | | | |
|---|---|---|---|---|
| 9,852,177 | B1 * | 12/2017 | Cheung | G06F 16/2255 |
| 10,637,715 | B1 * | 4/2020 | Vasilyev | H04L 41/0816 |
| 11,483,326 | B2 * | 10/2022 | Meir | G06N 20/00 |
| 11,777,786 | B2 * | 10/2023 | Elsakhawy | H04L 41/16 |

(Continued)

OTHER PUBLICATIONS

Zhou, Sheng, et al. "Why is the prediction wrong? Towards underfitting case explanation via meta-classification." 2022 IEEE 9th International Conference on Data Science and Advanced Analytics (DSAA). IEEE, 2022. (Year: 2022).*

(Continued)

*Primary Examiner* — Andrew L Tank

(74) *Attorney, Agent, or Firm* — Foley & Lardner LLP

(57) ABSTRACT

In some aspects, a computing system may identify a feature that can be used to distinguish between data that is more likely to be representative of the target population. A computing system may identify a feature in a dataset where a first value of the feature is associated with a higher likelihood that a corresponding sample is not a member of the target population. Due to the differences between samples that have the first value and samples that have the second value, the computing system may determine that samples with the first value are less likely to be members of the target population or samples with the second value are more likely to be members of the target population. The computing system may determine that a training dataset should be generated using samples that have the second value.

20 Claims, 4 Drawing Sheets

400

(56) References Cited

U.S. PATENT DOCUMENTS

| | | | | |
|---|---|---|---|---|
| 11,790,411 | B1 * | 10/2023 | Mann | G06Q 30/0281 704/9 |
| 12,192,120 | B2 * | 1/2025 | Franklin | H04L 41/147 |
| 2020/0175421 | A1 * | 6/2020 | Zhou | G06F 18/2451 |
| 2021/0037044 | A1 * | 2/2021 | Achanta | G06V 10/82 |
| 2021/0142222 | A1 * | 5/2021 | Chang | G06N 20/10 |
| 2022/0078071 | A1 * | 3/2022 | Agapitos | H04L 41/16 |
| 2022/0129727 | A1 * | 4/2022 | Chen | G06Q 20/4015 |
| 2022/0138561 | A1 * | 5/2022 | Prendki | G06N 3/08 706/12 |
| 2022/0166782 | A1 * | 5/2022 | Zoldi | G06Q 20/4016 |
| 2022/0207352 | A1 * | 6/2022 | Barr | G06N 3/09 |
| 2022/0237415 | A1 * | 7/2022 | Lohia | G06F 18/2155 |
| 2022/0269991 | A1 * | 8/2022 | Kurokawa | G06N 3/0442 |
| 2022/0374784 | A1 * | 11/2022 | Sharma | G06N 5/01 |
| 2023/0097940 | A1 * | 3/2023 | Kurokawa | G06N 3/0464 706/12 |
| 2023/0162049 | A1 * | 5/2023 | Hall | G16H 50/70 706/45 |
| 2023/0206096 | A1 * | 6/2023 | Paiement | G06N 3/047 706/52 |
| 2023/0267689 | A1 * | 8/2023 | Breitweiser | G06Q 50/26 345/419 |
| 2023/0336403 | A1 * | 10/2023 | Gupta | H04L 41/142 |
| 2023/0410191 | A1 * | 12/2023 | Swaminathan | G06Q 40/02 |
| 2024/0028996 | A1 * | 1/2024 | Fani Sani | G06Q 10/0633 |
| 2024/0119153 | A1 * | 4/2024 | Ludmir | G06N 5/01 |
| 2024/0134972 | A1 * | 4/2024 | Boue | G06F 18/2433 |
| 2024/0394574 | A1 * | 11/2024 | Datta | G06N 3/0464 |

OTHER PUBLICATIONS

Qi, Wenting, and Charalampos Chelmis. “Improving algorithmic decision-making in the presence of untrustworthy training data.” 2021 IEEE international conference on big data (big data). IEEE, 2021. (Year: 2021).*

Piccialli, Veronica, Dolores Romero Morales, and Cecilia Salvatore. “Supervised Feature Compression based on Counterfactual Analysis.” arXiv preprint arXiv:2211.09894 (2022). (Year: 2022).*

Wexler, James, et al. “The what-if tool: Interactive probing of machine learning models.” IEEE transactions on visualization and computer graphics 26.1 (2019): 56-65. (Year: 2019).*

* cited by examiner

200

| | Feature 210 | Feature 211 | Feature 212 | Feature 213 | Feature 214 | Label 215 |
|---|---|---|---|---|---|---|
| 220 | 36.73 | 50,367 | 0 | 3 | Chat | 0 |
| 221 | 141.31 | 165,806 | 0 | 2 | Branch | 0 |
| 222 | 542.11 | 103,452 | 1 | 4 | Virtual Reality | 1 |

FIG. 2

SYSTEMS AND METHODS FOR TRAINING A MACHINE LEARNING MODEL TO CONFIRM RESULTS OF EVENT DETECTION

SUMMARY

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. For example, existing systems often need high quality training data for models but are unable to distinguish between high quality data and low quality data. If low quality data or the wrong data is used to train a machine learning model, the model may produce results that are not helpful. Further, low quality data can lead to training a model that generates misleading results. In addition to the computer resources used to train a machine learning model, if low quality data is used for training, the machine learning model may encourage a user or organization to perform actions that are even more wasteful. For example, low quality data may not be representative of the population for which a computing system would like to make inference. Due to the population's lack of representation in the training data, a machine learning model may not be able to be trained to accurately make inference for the population. For example, if a model is trained to detect or confirm whether a user is performing a malicious action using data that is not representative of the computing systems used to actually perform the malicious actions, the model may be unable to adequately detect the computing systems that are performing the malicious actions. This may lead to an increase in cybersecurity incidents for an organization.

To address these issues, non-conventional methods and systems described herein may determine which data from a dataset more accurately reflects a target population. Specifically, a computing system may determine what data should be used to train a model by identifying a feature (e.g., a faulty feature) that can be used to distinguish between data that is more likely to be representative of the target population and data that is less likely to be representative of the target population. A computing system may identify a feature in a dataset where a first value of the feature is associated with a higher likelihood that a corresponding sample is not a member of the target population. For example, presence of a first value of the feature in a sample may be associated with greater than a threshold likelihood of the sample being classified with a first classification and presence of a second value of the feature in a sample is associated with less than a threshold likelihood of the sample being classified with the first classification. Due to the differences in classifications between samples that have the first value and samples that have the second value, the computing system may determine that samples with the first value are less likely to be members of the target population or samples with the second value are more likely to be members of the target population. The computing system may determine that a training dataset should be generated using samples that have the second value, for example, because those samples are more likely to be members of the target population. By doing so, the computing system may improve the quality of training data and thereby may improve the accuracy of a model and reduce time needed to train a model.

In some aspects, a computing system may obtain an identification of a label corresponding to a set of classifications. The computing system my obtain a first dataset associated with the label, the first dataset comprising a set of samples, with each sample of the set of samples comprising a plurality of values corresponding to a user, and wherein each sample of the set of samples comprises a label indicating a classification of the set of classifications. The computing system may identify a faulty feature associated with the first dataset, wherein presence of a first value of the faulty feature in a first sample of the first dataset is associated with greater than a threshold likelihood of the first sample being classified as a first classification of the set of classifications and presence of a second value of the faulty feature in a second sample is associated with less than a threshold likelihood of the second sample being classified as the first classification of the set of classifications. Based on the faulty feature, the computing system may generate a training dataset comprising a subset of samples of the first dataset, wherein more than a threshold proportion of the subset of samples comprise the second value for the faulty feature. The computing system may train, based on the training dataset, a first machine learning model to generate output indicating whether a sample should be classified as the first classification.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows a portion of an example dataset that may be used to generate a training dataset, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
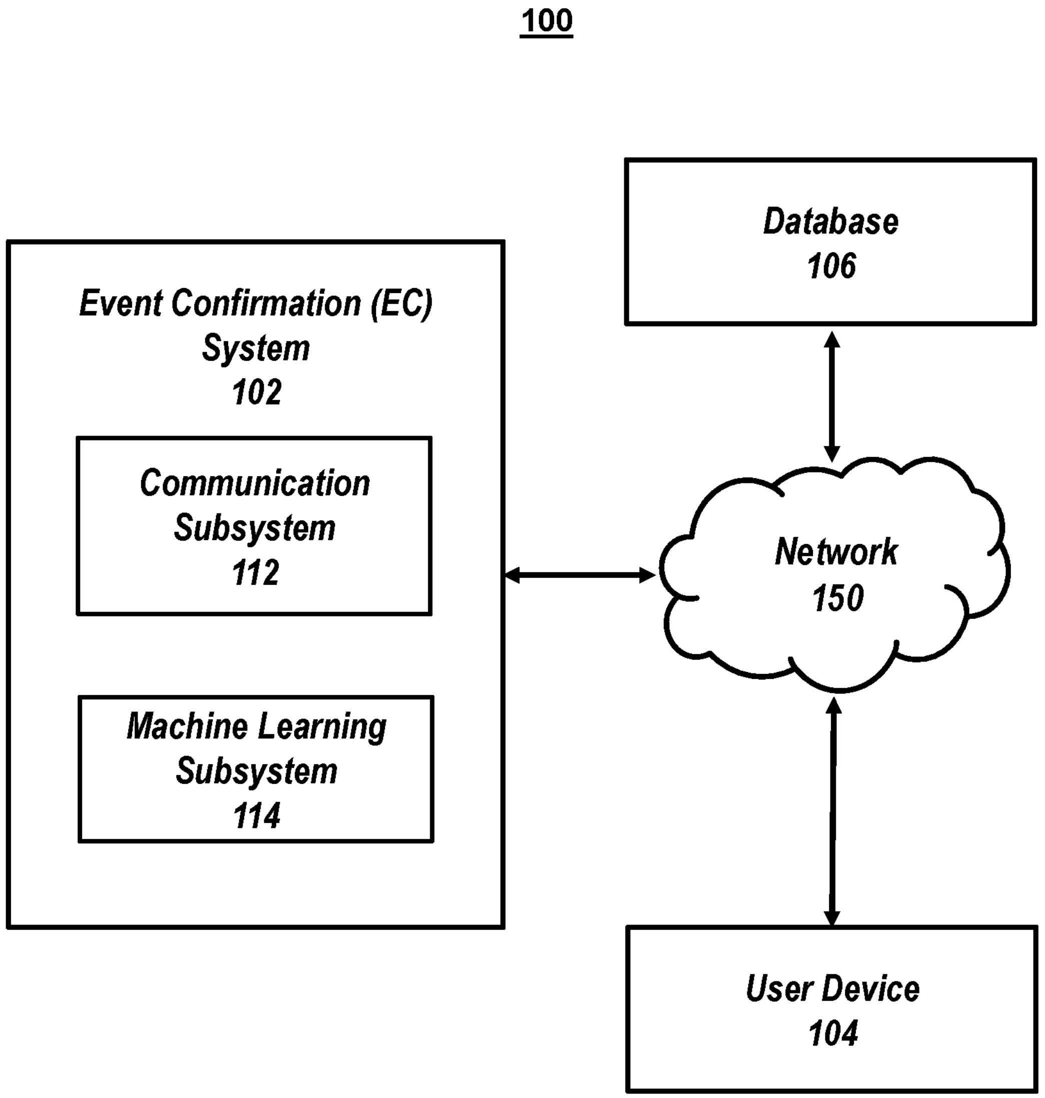
FIG. 1 shows an illustrative diagram for a system that may use machine learning to confirm events, in accordance with one or more embodiments.

FIG. 1 shows an illustrative system 100 for identifying what data should be used for training a machine learning model. The system 100 may determine what data should be used to train a model by identifying a feature (e.g., a faulty feature) that can be used to distinguish between data that is more likely to be representative of the target population and data that is less likely to be representative of the target population. The system 100 may identify a feature in a dataset where a first value of the feature is associated with a higher likelihood that a corresponding sample is not a member of the target population. In one example, the system 100 may determine that a first value of a feature that indicates a first operating system was installed led to more than a threshold proportion of cyber intrusion incidents, whereas having a second value of the feature indicating a second operating system installed led to less than a threshold proportion of cyber intrusion incidents. In this example, the computing system may be able to use samples that had the second value of the faulty feature to train the machine learning model because the samples with the first feature are determined to be less useful or do not accurately represent a population for which the machine learning model is being used to generate predictions.

In one example, the system 100 may determine that a first value of a feature that indicates a financial incentive was available to users if a life event had occurred, led to more than a threshold proportion of users claiming that a life event had occurred, whereas having a second value of the feature, indicating a financial incentive was not available, led to less than a threshold proportion of users claiming that a life event had occurred. In this example, the computing system may use samples that had the second value of the faulty feature to train the machine learning model because the samples with the first feature may have a lower likelihood of reflecting users that actually had the life event that was claimed. The computing system may generate a training dataset comprising a subset of samples of the first dataset that have the second value for the faulty feature. By doing so, the system 100 may improve the quality of training data and thereby may improve the accuracy and reduce the time to train a machine learning model.

The system 100 may include an event confirmation (EC) system 102, a server 106, and a user device 104 that may communicate with each other via a network 150. The EC system 102 may include a communication subsystem 112, a machine learning subsystem 114, or other components. The EC system 102 may obtain (e.g., via the communication subsystem 112) an indication of a label. For example, the EC system 102 may obtain an identification of an event label indicative of whether an event has occurred. A label may be a target output for a machine learning model. A label may indicate a correct classification for a corresponding sample and may be used by the machine learning model to learn. In one example, a label of 0 may indicate that a user should not be approved for a banking product (e.g., a loan, a credit card, etc.) while a label of 1 may indicate that a user should be approved for a banking product. In one example, the event label may be a binary value (e.g., 0 or 1), with 0 indicating that no life event has occurred within a threshold time period (e.g., one month) and with 1 indicating that a life event has occurred within a threshold time period. The identification of the event label may indicate a location where the event label is stored. For example, the identification may be a uniform resource locator, a variable stored in a data structure, a memory address, or a variety of other identifications. The event may be a life event of a user. For example, the event may include a birthday, purchase of a house, purchase of a car, birth of a baby, graduation from school (e.g., high school, university, etc.), receipt of an award, marriage, or a variety of other life events. In one example, the event label may indicate what life event occurred (e.g., which of the above listed life events occurred).

The EC system 102 may obtain a first dataset. For example, the EC system 102 may obtain a first dataset associated with the event label. The first dataset may include a set of samples. Each sample of the set of samples may include a plurality of values corresponding to a user. In one example, the first dataset may be associated with life events of users. In this example, each sample in the dataset may correspond to a user and each sample may have a corresponding label indicating whether a life event has occurred in the user's life. As described in more detail below, the EC system 102 may use the first dataset to generate a training dataset for one or more machine learning models. For example, the EC system 102 may determine a feature (e.g., a faulty feature) that can be used to separate data that may be more helpful in training a machine learning model from other data that may be less helpful in training a machine learning model, for example, as described in more detail below.

Referring to FIG. 2, a portion of an example dataset 200 is shown. The dataset 200 may include samples 220-222. Sample 220 may correspond to a first user, sample 221 may correspond to a second user, and sample 222 may correspond to a third user. Each sample may include values that correspond to the features 210-214 and the label 215. The feature 210 may include transaction data related to purchases made by a corresponding user. The feature 211 may include the income of a corresponding user. The feature 212 may indicate whether a financial incentive was available to the corresponding user if the user had a life event. For example, the value 0 may indicate that no financial incentive was available and the value 1 may indicate that a financial incentive was available. The feature 213 may indicate the number of accounts a corresponding user has with a bank. The feature 214 may indicate how a user interacted with a bank. For example, "chat" may indicate that the user interacted with a bank via a chat on a website or other application, "branch" may indicate that the user visited a bank branch in person, and "virtual reality" may indicate that the user interacted with the bank in a virtual reality setting. The label 215 may indicate whether the user had a life event. For example, 0 may indicate that the user had no life event and 1 may indicate that the user had a life event. The EC system 102 may use one or more features to determine a subset of data for training a machine learning model, for example, to distinguish between users that have actually had a life event and users that may be falsely claiming to have had a life event. For example, the EC system 102 may determine that for the feature 212, samples that had a value of 1 are more likely to have one classification (e.g., a user having a life event) and a value of 0 are less likely to have the classification. The data samples that do not include the feature value of 1 for feature 212 (e.g., the feature associated with the financial incentive) may therefore be more useful for training a machine learning model to recognize other users that have actually had a life event because it is more likely that those data samples belong to the population of users that actually had life events.

Referring back to FIG. 1, the EC system 102 may identify a faulty feature associated with the first dataset. A faulty feature may be a feature that can be used to differentiate one set of samples from another set of samples. For example, if a sample has a particular value for a faulty feature, the sample may be determined to not be useful for training a machine learning model. If a second sample has a different value for the faulty feature, the second sample may be determined to be useful for training a machine learning model. A faulty feature may be a feature such that presence of a first value of the feature is associated with greater than a threshold likelihood of a sample being classified with a first classification and presence of a second value of the feature is associated with less than a threshold likelihood of the sample being classified with the first classification.

In one example, the EC system 102 may identify a faulty feature in the dataset associated with life events of users described above. In this example, the EC system 102 may identify that a financial incentive feature, indicating whether a financial incentive was offered to a user if the user had a life event (e.g., a qualifying life event), is a faulty feature. This identification may have been made because users that have a financial incentive may be more likely to lie about having a life event. Continuing with the example, the EC system 102 may determine that there was greater than a threshold likelihood of a user being associated with a label (e.g., or classification) of having a life event if the financial incentive feature indicates that the financial incentive was offered to the user. The EC system 102 may determine that there was less than a threshold likelihood of a user being associated with a label of not having a life event if the financial incentive feature indicates that the financial incentive was not offered to the user.

As explained in more detail below, by identifying a faulty feature, the EC system 102 may determine which data should or should not be used to train a machine learning model, and may thus improve the quality of the training data. With improved quality of training data, the EC system 102 may be able to train a machine learning model more quickly (e.g., with fewer epochs) or achieve better results, for example, with improved accuracy, precision, or recall.

In some embodiments, the EC system 102 may identify a faulty feature based on input received from a user device. In one example, the EC system 102 may receive, from a user device, an indication of a feature. Based on receiving the indication of the feature, the EC system 102 may identify the feature as the faulty feature.

In some embodiments, the EC system 102 may identify a faulty feature through the use of counterfactual samples. As referred to herein, a "counterfactual sample" may include any set of values that is designed to cause a machine learning model to generate output that is different from a corresponding sample. A counterfactual sample may include the feature values of an original sample with some of the feature values having been modified such that the output of the machine learning model changes in a relevant way. For example, the class output by the machine learning model for the counterfactual sample may be opposite of the class output for the original sample. Additionally, or alternatively, a counterfactual sample may cause the machine learning model to generate output that reaches a certain threshold (e.g., where the machine learning model outputs a probability that a user fails to make a payment is 10% or greater). When generating a counterfactual sample from an original sample, the EC system 102 may try to minimize the amount of change to the feature values of the original sample while still changing the machine learning model's output.

A counterfactual sample may be generated using a variety of counterfactual sample generation techniques. For example, the EC system 102 may use the multi-objective counterfactuals (MOC) method to generate the counterfactual samples. The MOC method may translate a search for counterfactual samples into a multi-objective optimization problem. In some embodiments. As an additional example, the EC system 102 may use the Deep Inversion for Synthesizing Counterfactuals (DISC) method to generate the counterfactual samples. The DISC method may use (a) stronger image priors, (b) incorporate a novel manifold consistency objective, and (c) adopt a progressive optimization strategy. In some embodiments, the EC system 102 may use counterfactual sample generation techniques that include accessing gradients of a machine learning model or accessing model internals of the machine learning model (e.g., accessing one or more layers or weights of a machine learning model).

The EC system 102 may generate, based on the first dataset, a set of counterfactual samples. A first counterfactual sample of the set of counterfactual samples may include a modification to a first sample of the first dataset. For example, the modification may cause a sample that would normally be classified with an indication that a life event occurred, to instead be classified with an indication that the life event has not occurred. The EC system 102 may determine, based on the set of counterfactual samples, that a first feature was modified for more than a threshold proportion of the set of counterfactual samples. The EC system 102 may count the number of times each feature was changed to create the counterfactual samples. For example, out of 100 counterfactual samples generated, the EC system 102 may determine that a first feature was changed for 70 samples, a second feature was changed for 20 samples, and a third feature was changed for 10 samples. The EC system 102 may determine that the first feature is the faulty feature, for example, because the first feature was changed more often than the second and third features. Additionally or alternatively, the EC system 102 may identify the first feature as the faulty feature, for example, based on the first feature being modified for more than a threshold proportion of the counterfactual samples.

The EC system 102 may generate a training dataset. The training dataset may include a subset of samples in the first dataset. The subset of samples may be determined, for example, based on a faulty feature identified by the EC system 102. The EC system 102 may determine that one or more values of the faulty feature may indicate that a sample should not be used to train a machine learning model. For example, the EC system 102 may determine that a value indicating that there was a financial incentive for having a life event may cause unreliable labels. A user may indicate that a life event occurred to receive the financial incentive even though the life event did not actually occur. The EC system 102 may determine not to use such samples to train a machine learning model because they may not reflect the population of users who actually had a life event occur. For example, a user that lied about having a baby may have different demographics, purchasing habits, or other characteristics (e.g., feature values) from a user that actually had a baby.

In some embodiments, the EC system 102 may identify a value of the faulty feature that should be avoided and may remove any samples of the first dataset that have the value of the faulty feature. For example, the EC system 102 may generate a training dataset by removing, from the first dataset, any sample that has a value indicating that a financial incentive was available to a user that had a life event.

Figure 4:
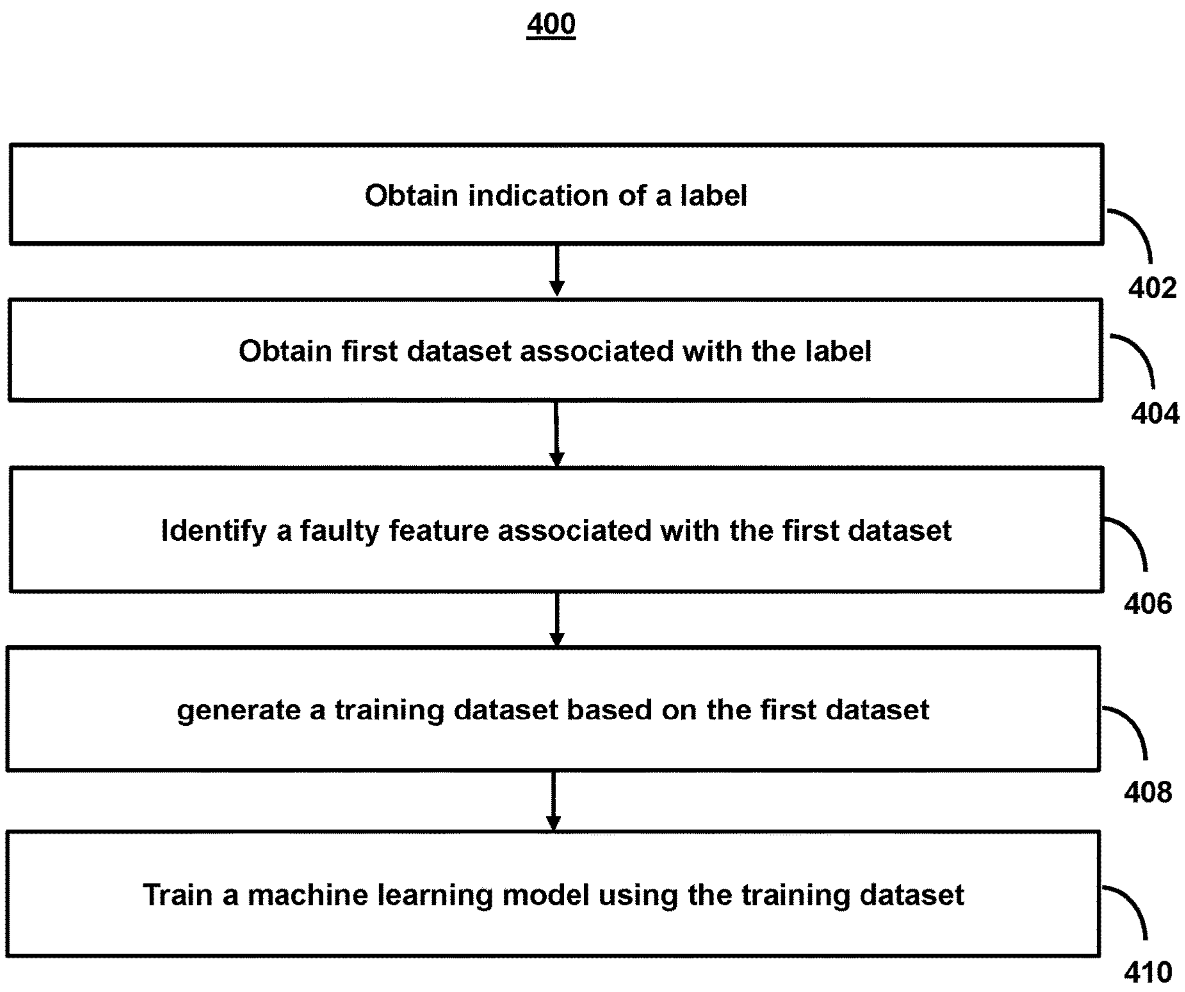
FIG. 4 shows a flowchart of the steps involved in determining what training data to use for training a machine learning model to confirm events, in accordance with one or more embodiments.

The EC system 102 may train a machine learning model using the training dataset generated at step 408 in FIG. 4. For example, the EC system 102 may train, based on the training dataset, a first machine learning model to generate output indicating a likelihood that an event that has been asserted by a user has actually occurred.

In some embodiments, the EC system 102 may use the trained machine learning model, for example, to confirm whether a user has experienced a life event. The EC system 102 may obtain an indication that a user has asserted that a life event has occurred. For example, via a user device, the user may input an indication that a life event has occurred. In one example, the user may indicate that the user has had a new baby. In some embodiments, the user device may be associated with a first avatar in a virtual reality setting (e.g., a virtual world) and a chatbot that interacts with the user via the user device may be associated with a second avatar in the virtual reality setting. The EC system 102 may use the machine learning model to determine a likelihood that the user has had the life event the user is claiming to have had. The EC system 102 may determine, via a second machine learning model (e.g., a natural language processing model), that the input asserts that an event (e.g., a life event) has occurred. The event may correspond to a user of the user device. Based on the input asserting that an event has occurred, the EC system 102 may input data associated with the user into the first machine learning model. Based on the first machine learning model generating output indicating that the event has actually occurred, the EC system 102 may generate a recommendation associated with the user.

In some embodiments, the recommendation associated with the user may be a recommendation for a financial incentive. For example, the EC system 102 may recommend sending a gift card, generating or sending a congratulatory or condolence message, providing an advantaged rate (e.g., a rate that is lower than a threshold rate) or a code for opening an account, adjusting terms for an account (e.g., by lowering an interest rate by a threshold amount, increasing a credit limit by a threshold amount, etc.), or sending a message with a deep-link to make it easy to perform an action associated with an account.

By confirming that a user has had a life event with the machine learning model, the EC system 102 may make a chatbot or other natural language processing (NLP) system better able to respond to users. For example, the EC system 102 may be able to offer a user a reward for having the life event and may create a better user experience and a more life-like NLP system.

In some embodiments, the EC system 102 may generate one or more visualizations associated with the faulty feature or the training dataset. For example, the EC system 102 may generate a user interface or information used to generate a user interface that includes an indication of the faulty feature and a portion of the training dataset. The EC system 102 may cause display of the user interface, for example, by sending information associated with the user interface to a user device.

Figure 3:
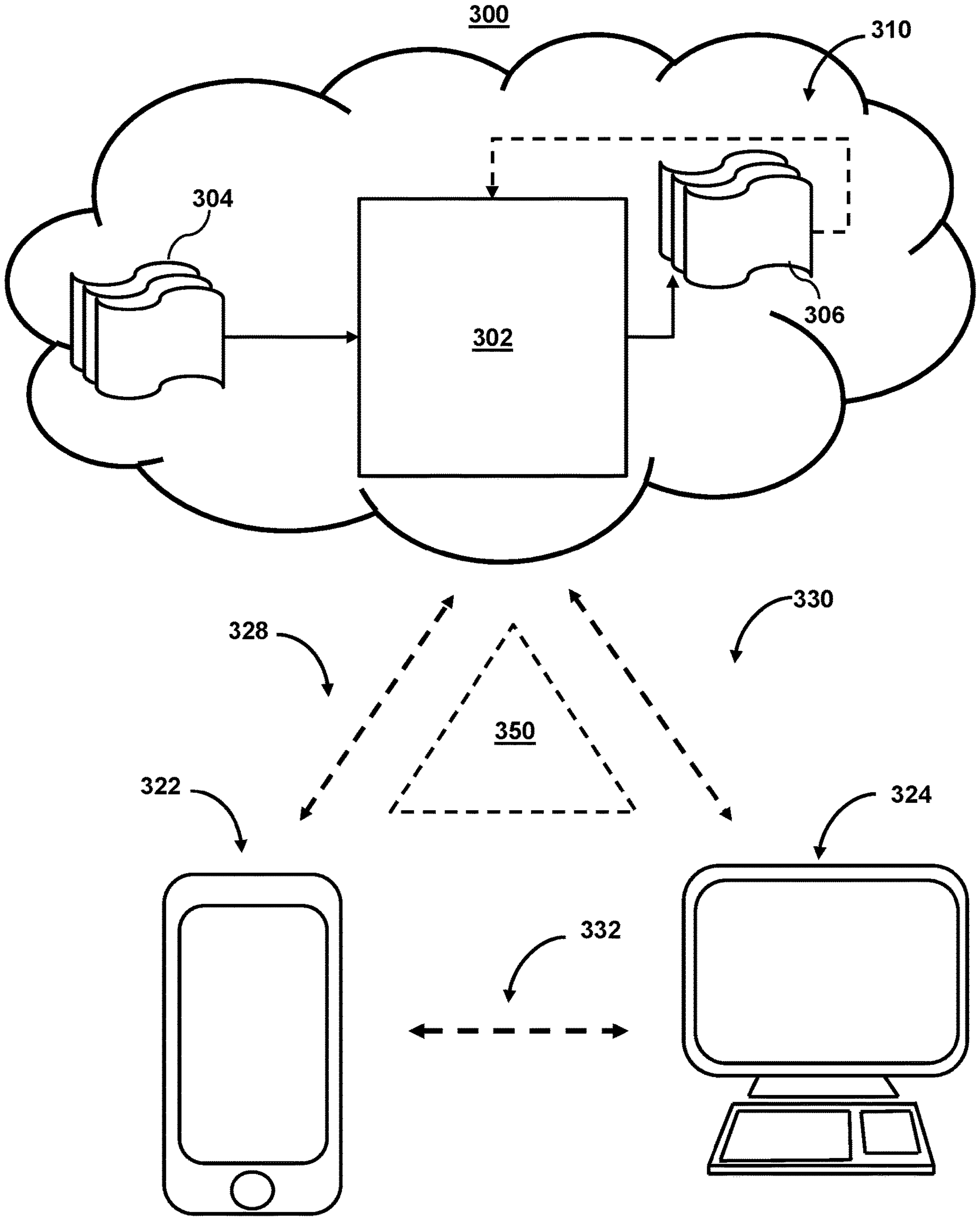
FIG. 3 shows illustrative components for a system that may be used to confirm events, in accordance with one or more embodiments.

FIG. 3 shows illustrative components for a system 300 used for training machine learning models or using machine learning models (e.g., to confirm whether an event has occurred or perform any other action described in connection with FIGS. 1, 2, and 4), in accordance with one or more embodiments. The components shown in system 300 may be used to perform any of the functionality described above in connection with FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, mobile devices, and/or any device or system described in connection with FIGS. 1-2, and 4. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., data related to training machine learning models, or any other action described in connection with FIGS. 1, 2, and 4).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen, and/or a dedicated input device such as a remote control, mouse, voice input, etc.). Additionally, the devices in system 300 may run an application (or another suitable program). The application may cause the processors and/or control circuitry to perform operations related to training machine learning models or using machine learning models (e.g., to confirm whether an event has occurred or perform any other action described in connection with FIGS. 1, 2, and 4).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or Long-Term Evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the EC system 102 or the user device 104 described in connection with FIG. 1.

Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., used for training machine learning models or using machine learning models, for example, to confirm whether an event has occurred or perform any other action described in connection with FIGS. 1, 2, and 4).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The model (e.g., model 302) may be used to confirm whether an event has occurred or perform any other action described in connection with FIGS. 1, 2, and 4.

System 300 also includes application programming interface (API) layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying web application firewall (WAF) and distributed denial-of-service (DDoS) protection, and API layer 350 may use RESTful APIs as standard for external integration.

FIG. 4 shows a flowchart of the steps involved in using a surrogate model to monitor a machine learning model, in accordance with one or more embodiments. Although described as being performed by a computing system, one or more actions described in connection with process 400 of FIG. 4 may be performed by one or more devices shown in FIGS. 1-3. The processing operations presented below are intended to be illustrative and non-limiting. In some embodiments, for example, the method may be accomplished with one or more additional operations not described, or without one or more of the operations discussed. Additionally, the order in which the processing operations of the methods are illustrated (and described below) is not intended to be limiting.

At step 402, a computing system may obtain an indication of a label. For example, the computing system may obtain an identification of an event label indicative of whether an event has occurred. In one example, the event label may be a binary value (e.g., 0 or 1), with 0 indicating that no life event has occurred within a threshold time period (e.g., one month) and with 1 indicating that a life event has occurred within a threshold time period. The identification of the event label may indicate a location where the event label is stored. For example, the identification may be a uniform resource locator, a variable stored in a data structure, a memory address, or a variety of other identifications. The event may be a life event of a user. For example, the event may include a birthday, purchase of a house, purchase of a car, birth of a baby, graduation from school (e.g., high school, university, etc.), receipt of an award, marriage, or a variety of other life events. In one example, the event label may indicate what life event occurred (e.g., which of the above listed life events occurred).

At step 404, the computing system may obtain a first dataset. For example, the computing system may obtain a first dataset associated with the event label. The first dataset may include a set of samples. Each sample of the set of samples may include a plurality of values corresponding to a user. For example, the values may include any values described above in connection with FIGS. 1-2. In one example, the first dataset may be associated with life events of users. In this example, each sample in the dataset may correspond to a user and each sample may have a corresponding label indicating whether a life event has occurred in the user's life. As described in more detail below, the computing system may use the first dataset to generate a training dataset for one or more machine learning models. For example, the computing system may determine a feature (e.g., a faulty feature) that can be used to separate data that may be more helpful in training a machine learning model from other data that may be less helpful in training a machine learning model, for example, as described in more detail below.

At step 406, the computing system may identify a faulty feature associated with the first dataset (e.g., the first dataset obtained at step 404). A faulty feature may be a feature such that presence of a first value of the feature is associated with greater than a threshold likelihood of a sample being classified with a first classification and presence of a second value of the feature is associated with less than a threshold likelihood of the sample being classified with the first classification. In one example, the computing system may identify a faulty feature in the dataset associated with life events of users described above. In this example, the computing system may identify that a financial incentive feature, indicating whether a financial incentive was offered to a user if the user had a life event (e.g., a qualifying life event), is a faulty feature. This identification may have been made because users that have a financial incentive may be more likely to lie about having a life event. Continuing with the example, the computing system may determine that there was greater than a threshold likelihood of a user being associated with a label (e.g., or classification) of having a life event if the financial incentive feature indicates that the financial incentive was offered to the user. The computing system may determine that there was less than a threshold likelihood of a user being associated with a label of not having a life event if the financial incentive feature indicates that the financial incentive was not offered to the user.

As explained in more detail below, by identifying a faulty feature, the computing system may determine which data should or should not be used to train a machine learning model, and may thus improve the quality of the training data. With improved quality of training data, the computing system may be able to train a machine learning model more quickly (e.g., with fewer epochs) or achieve better results, for example, with improved accuracy, precision, or recall.

In some embodiments, the computing system may identify a faulty feature based on input received from a user device. In one example, the computing system may receive, from a user device, an indication of a feature. Based on receiving the indication of the feature, the computing system may identify the feature as the faulty feature.

In some embodiments, the computing system may identify a faulty feature through the use of counterfactual samples. For example, the computing system may generate, based on the first dataset, a set of counterfactual samples. A first counterfactual sample of the set of counterfactual samples may include a modification to a first sample of the first dataset. The modification may cause a machine learning model to generate a classification for the first counterfactual sample that is different from a classification generated for the first sample. For example, the modification may cause a sample that would normally be classified with an indication that a life event occurred to instead be classified with an indication that the life event has not occurred. The computing system may determine, based on the set of counterfactual samples, that a first feature was modified for more than a threshold proportion of the set of counterfactual samples. Based on the first feature being modified for more than the threshold proportion, the computing system may identify the first feature as the faulty feature.

At step 408, the computing system may generate a training dataset. The training dataset may include a subset of samples in the first dataset. The subset of samples may be determined based on the faulty feature identified in step 406. The computing system may determine that one or more values of the faulty feature may indicate that a sample should not be used to train a machine learning model. For example, the computing system may determine that a value indicating that there was a financial incentive for having a life event may cause unreliable labels. A user may indicate that a life event occurred to receive the financial incentive even though the life event did not actually occur. The computing system may determine not to use such samples to train a machine learning model because they may not reflect the population of users who actually had a life event occur. For example, a user that lied about having a baby may have different demographics, purchasing habits, or other characteristics (e.g., feature values) from a user that actually had a baby.

The computing system may include samples in the training dataset that have a particular value for the faulty feature identified in step 406. For example, each sample in the subset of samples may include a value (e.g., the second value described in step 406) for the faulty feature. The value may be associated with less than a threshold likelihood of a sample being classified as having the event. In some embodiments, the computing system may identify a value of the faulty feature that should be avoided and may remove any samples of the first dataset that have the value of the faulty feature. For example, the computing system may generate a training dataset by removing, from the first dataset, any sample that has a value indicating that a financial incentive was available to a user that had a life event.

At step 410, the computing system may train a machine learning model using the training dataset generated in step 408. For example, the computing system may train, based on the training dataset, a first machine learning model to generate output indicating a likelihood that an event that has been asserted by a user has actually occurred.

In some embodiments, the computing system or a different computing system (e.g., any computing system described above in connection with FIGS. 1-3) may use the trained machine learning model in a production environment, for example, to confirm whether a user has experienced a life event. For example, a computing system may obtain an indication that a user has asserted that a life event has occurred. The computing system may use the machine learning model to determine a likelihood that the user has had the life event the user is claiming to have had. For example, the computing system may obtain, via a chatbot, input from a user device. In some embodiments, the user device may be associated with a first avatar in a virtual reality setting (e.g., a virtual world) and the chatbot may be associated with a second avatar in the virtual reality setting. The computing system may determine, via a second machine learning model (e.g., a NLP model), that the input asserts that an event (e.g., a life event) has occurred. The event may correspond to a user of the user device. Based on the input asserting that an event has occurred, the computing system may input data associated with the user into the first machine learning model. Based on the first machine learning model generating output indicating that the event has actually occurred, the computing system may generate a recommendation associated with the user.

In some embodiments, the recommendation associated with the user may be a recommendation for a financial incentive. For example, the computing system may recommend sending a gift card, generating or sending a congratulatory or condolence message, providing an advantaged rate (e.g., a rate that is lower than a threshold rate) or code for opening an account, adjusting terms for an account (e.g., by lowering an interest rate by a threshold amount, increasing credit limit by a threshold amount, etc.), or sending a message with a deep-link to make it easy to perform an action associated with an account.

By confirming that a user has had a life event with the machine learning model, the computing system may make a chatbot or other NLP system better able to respond to users. For example, the computing system may be able to offer a user a reward for having the life event and may create a better user experience and a more life-like NLP system.

In some embodiments, the computing system may generate one or more visualizations associated with the faulty feature or the training dataset. For example, the computing system may generate a user interface or information used to generate a user interface that includes an indication of the faulty feature and a portion of the training dataset. The computing system may cause display of the user interface, for example, by sending information associated with the user interface to a user device.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining an identification of a label corresponding to a set of classifications; obtaining a first dataset associated with the label, the first dataset comprising a set of samples, with each sample of the set of samples comprising a plurality of values corresponding to a user, and wherein each sample of the set of samples comprises a label indicating a classification of the set of classifications; identifying a faulty feature associated with the first dataset, wherein presence of a first value of the faulty feature in a first sample of the first dataset is associated with greater than a threshold likelihood of the first sample being classified as a first classification of the set of classifications and presence of a second value of the faulty feature in a second sample is associated with less than a threshold likelihood of the second sample being classified as the first classification of the set of classifications; based on the faulty feature, generating, a training dataset comprising a subset of samples of the first dataset, wherein more than a threshold proportion of the subset of samples comprise the second value for the faulty feature; and training, based on the training dataset, a first machine learning model to generate output indicating whether a sample should be classified as the first classification.

2. The method of any of the previous embodiments, further comprising: obtaining, via a chatbot, input from a user device; determining, via a second machine learning model, that the input asserts an event has occurred, the event corresponding to a user of the user device; based on the input asserting an event has occurred, inputting data associated with the user into the first machine learning model; and based on the first machine learning model generating output indicating that the event has actually occurred, generating a recommendation associated with the user.

3. The method of any of the previous embodiments, wherein the user device is associated with a first avatar in a virtual world and the chatbot is associated with a second avatar in the virtual world.

4. The method of any of the previous embodiments, wherein identifying the faulty feature associated with the first dataset comprises: receiving, from a user device, an indication of a feature; and based on receiving the indication of the feature, identifying the feature as the faulty feature.

5. The method of any of the previous embodiments, wherein identifying the faulty feature associated with the first dataset comprises: generating, based on the first dataset, a set of counterfactual samples, wherein a first counterfactual sample of the set of counterfactual samples comprises a modification to a first sample of the first dataset, wherein the modification causes a second machine learning model to generate a classification for the first counterfactual sample that is different from a classification generated for the first sample; determining, based on the set of counterfactual samples, that a first feature was modified for more than a threshold proportion of the set of counterfactual samples; and based on the first feature being modified for more than the threshold proportion, identifying the first feature as the faulty feature.

6. The method of any of the previous embodiments, further comprising: generating a user interface comprising an indication of the faulty feature and a portion of the training dataset; and causing display of the user interface.

7. The method of any of the previous embodiments, wherein each sample of the subset of samples comprises the second value for the faulty feature.

8. The method of any of the previous embodiments, wherein the output comprises a likelihood that the sample should be classified as the first classification.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

What is claimed is:

1. A machine learning system for increasing machine learning training efficiency and resulting model accuracy in confirming legitimate events from potentially malicious assertions, the system comprising:

one or more processors and one or more non-transitory media having instructions recorded thereon that, when executed by the one or more processors, cause operations comprising:

storing, in a database, a first dataset associated with an event label indicating whether an event has occurred, the first dataset comprising a set of samples comprising features, with each sample of the set of samples comprising a plurality of values of the features corresponding to a respective user, and wherein each sample of the set of samples comprises a label indicating whether the event has occurred;

training, based on a faulty feature associated with the first dataset in which (i) presence of a first value of the faulty feature in a first sample of the first dataset is associated with greater than a threshold likelihood of the first sample being classified as having the event and (ii) presence of a second value of the faulty feature in a second sample is associated with less than a threshold likelihood of the second sample being classified as having the event, a first machine learning model on a training dataset comprising samples of the first dataset having the second value for the faulty feature without one or more samples of the first dataset having the first value for the faulty feature; and in connection with a machine-model-derived indication that a user input asserts a given event has occurred, executing the first machine learning model in a computing environment to generate to obtain an output indicating a likelihood that the given event that has been asserted by a user has actually occurred.

2. The system of claim 1, the operations further comprising:

executing one or more counterfactual generation models to obtain a set of counterfactual samples, wherein a first counterfactual sample of the set of counterfactual samples comprises a modification to a given sample of the first dataset that causes a second machine learning model to generate a classification for the first counterfactual sample different from a classification for the given sample; and using, based on a first feature being modified in more than a threshold proportion of the set of counterfactual samples, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature that was modified in more than the threshold proportion of the set of counterfactual samples.

3. The system of claim 1, the operations further comprising:

receiving, from a user device, an indication of a first feature; and using, based on the indication of the first feature from the user device, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature.

4. The system of claim 1, the operations further comprising:

obtaining, via a chat interface with a chatbot, the user input from a user device of the user;

based on the machine-model-derived indication that the user input asserts the given event has occurred, inputting data associated with the user into the first machine learning model; and based on the first machine learning model generating output indicating that the event has actually occurred, generating a recommendation associated with the user.

5. The system of claim 4, wherein the user is associated with a first avatar in a virtual world, and the chatbot is associated with a second avatar in the virtual world.

6. A method comprising:

storing, in a database, a first dataset comprising a set of samples, wherein each sample of the set of samples comprises (i) a plurality of values corresponding to a respective user and (ii) a label indicating a classification of a set of classifications;

training, based on a faulty feature associated with the first dataset in which (i) presence of a first value of the faulty feature in a first sample of the first dataset is associated with greater than a threshold likelihood of the first sample being classified as a first classification of the set of classifications and (ii) presence of a second value of the faulty feature in a second sample is associated with less than a threshold likelihood of the second sample being classified as the first classification of the set of classifications, a first machine learning model on a training dataset comprising samples of the first dataset having the second value for the faulty feature without one or more samples of the first dataset having the first value for the faulty feature such that more than a threshold proportion of samples of the training dataset comprise the second value for the faulty feature; and executing the first machine learning model to obtain an output indicating whether a given sample should be classified as the first classification.

7. The method of claim 6, further comprising:

executing one or more counterfactual generation models to obtain a set of counterfactual samples, wherein a first counterfactual sample of the set of counterfactual samples comprises a modification to a given sample of the first dataset that causes a second machine learning model to generate a classification for the first counterfactual sample different from a classification for the given sample; and using, based on a first feature being modified in more than a threshold proportion of the set of counterfactual samples, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature that was modified in more than the threshold proportion of the set of counterfactual samples.

8. The method of claim 6, further comprising:

receiving, from a user device, an indication of a first feature; and using, based on the indication of the first feature from the user device, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature.

9. The method of claim 6, further comprising:

obtaining, via a chat interface with a chatbot, an input from a user device of a user;

determining, via an other machine learning model, that the input asserts a given event has occurred, wherein the given event corresponds to the user of the user device;

based on the input asserting the given event has occurred, inputting data associated with the user into the first machine learning model; and based on the first machine learning model generating output indicating that the given event has actually occurred, generating a recommendation associated with the user.

10. The method of claim 9, wherein the user device is associated with a first avatar in a virtual world, and the chatbot is associated with a second avatar in the virtual world.

11. The method of claim 6, further comprising:

displaying a user interface comprising an indication of the faulty feature and a portion of the training dataset.

12. The method of claim 6, wherein the output comprises a likelihood that the sample should be classified as the first classification.

13. One or more non-transitory computer-readable media comprising instructions that when executed by one or more processors, cause operations comprising:

storing, in a database, a first dataset comprising a set of samples, wherein each sample of the set of samples comprises (i) a plurality of values corresponding to a respective user and (ii) a label indicating a classification of a set of classifications;

training, based on a faulty feature associated with the first dataset in which (i) presence of a first value of the faulty feature in a first sample of the first dataset is associated with greater than a threshold likelihood of the first sample being classified as a first classification of the set of classifications and (ii) presence of a second value of the faulty feature in a second sample is associated with less than a threshold likelihood of the second sample being classified as the first classification of the set of classifications, a first machine learning model on a training dataset comprising samples of the first dataset having the second value for the faulty feature without one or more samples of the first dataset having the first value for the faulty feature; and executing the first machine learning model to obtain an output indicating whether a given sample should be classified as the first classification.

14. The one or more non-transitory computer-readable media of claim 13, the operations further comprising:

executing one or more counterfactual generation models to obtain a set of counterfactual samples, wherein a first counterfactual sample of the set of counterfactual samples comprises a modification to a given sample of the first dataset that causes a second machine learning model to generate a classification for the first counterfactual sample different from a classification for the given sample; and using, based on a first feature being modified in more than a threshold proportion of the set of counterfactual samples, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature that was modified in more than the threshold proportion of the set of counterfactual samples.

15. The one or more non-transitory computer-readable media of claim 13, the operations further comprising:

receiving, from a user device, an indication of a first feature; and using, based on the indication of the first feature from the user device, the first feature as the faulty feature to generate the training set for the training of the first machine learning model, wherein training the first machine learning model comprises training the first machine learning model on the training dataset comprising samples of the first dataset having the second value for the first feature without one or more samples of the first dataset having the first value for the first feature.

16. The one or more non-transitory computer-readable media of claim 13, the operations further comprising:

obtaining, via a chat interface with a chatbot, an input from a user device of a user;

determining, via an other machine learning model, that the input asserts a given event has occurred, wherein the given event corresponds to the user of the user device;

based on the input asserting the given event has occurred, inputting data associated with the user into the first machine learning model; and based on the first machine learning model generating output indicating that the given event has actually occurred, generating a recommendation associated with the user.

17. The one or more non-transitory computer-readable media of claim 16, wherein the user device is associated with a first avatar in a virtual world, and the chatbot is associated with a second avatar in the virtual world.

18. The one or more non-transitory computer-readable media of claim 13, the operations further comprising:

displaying a user interface comprising an indication of the faulty feature and a portion of the training dataset.

19. The one or more non-transitory computer-readable media of claim 13, wherein more than a threshold proportion of samples of the training dataset comprise the second value for the faulty feature.

20. The one or more non-transitory computer-readable media of claim 13, wherein the output comprises a likelihood that the sample should be classified as the first classification.

* * * * *